United States Patent
Inoue

(10) Patent No.: US 11,842,098 B2
(45) Date of Patent: Dec. 12, 2023

(54) INFORMATION PROCESSING APPARATUS THAT ENABLES AN INSTRUCTION FOR A PUSH SCAN WHEN A CONDITION IS SATISFIED, IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Go Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/687,954

(22) Filed: Mar. 7, 2022

(65) Prior Publication Data
US 2022/0283757 A1 Sep. 8, 2022

(30) Foreign Application Priority Data

Mar. 8, 2021 (JP) ................ 2021-036675

(51) Int. Cl.
*G06F 3/12* (2006.01)
*H04N 1/00* (2006.01)

(52) U.S. Cl.
CPC .......... *G06F 3/1222* (2013.01); *G06F 3/1238* (2013.01); *H04N 1/00854* (2013.01)

(58) Field of Classification Search
None
See application file for complete search history.

(56) References Cited

FOREIGN PATENT DOCUMENTS

| JP | 2017112508 A | * | 6/2017 |
| JP | 2017112508 A | | 6/2017 |

OTHER PUBLICATIONS

English translation of JP-2017112508-A (Year: 2017).*

* cited by examiner

*Primary Examiner* — Thomas D Lee
(74) *Attorney, Agent, or Firm* — Venable LLP

(57) ABSTRACT

There is provided with an information processing apparatus. A controlling unit, in a case where a condition related to at least any of a mode of communication with an image processing apparatus, a form of a connection with an image processing apparatus, and an authorization level of communication with an image processing apparatus is satisfied, enables an instruction for a push scan to the image processing apparatus. A sending unit transmits to the image processing apparatus a credential to be used in transmission processing in a push scan. The controlling unit, in a case where a condition related to at least any of the mode of communication, the connection form, and the authorization level is not satisfied, controls to not perform an instruction for a push scan to the image processing apparatus.

13 Claims, 18 Drawing Sheets

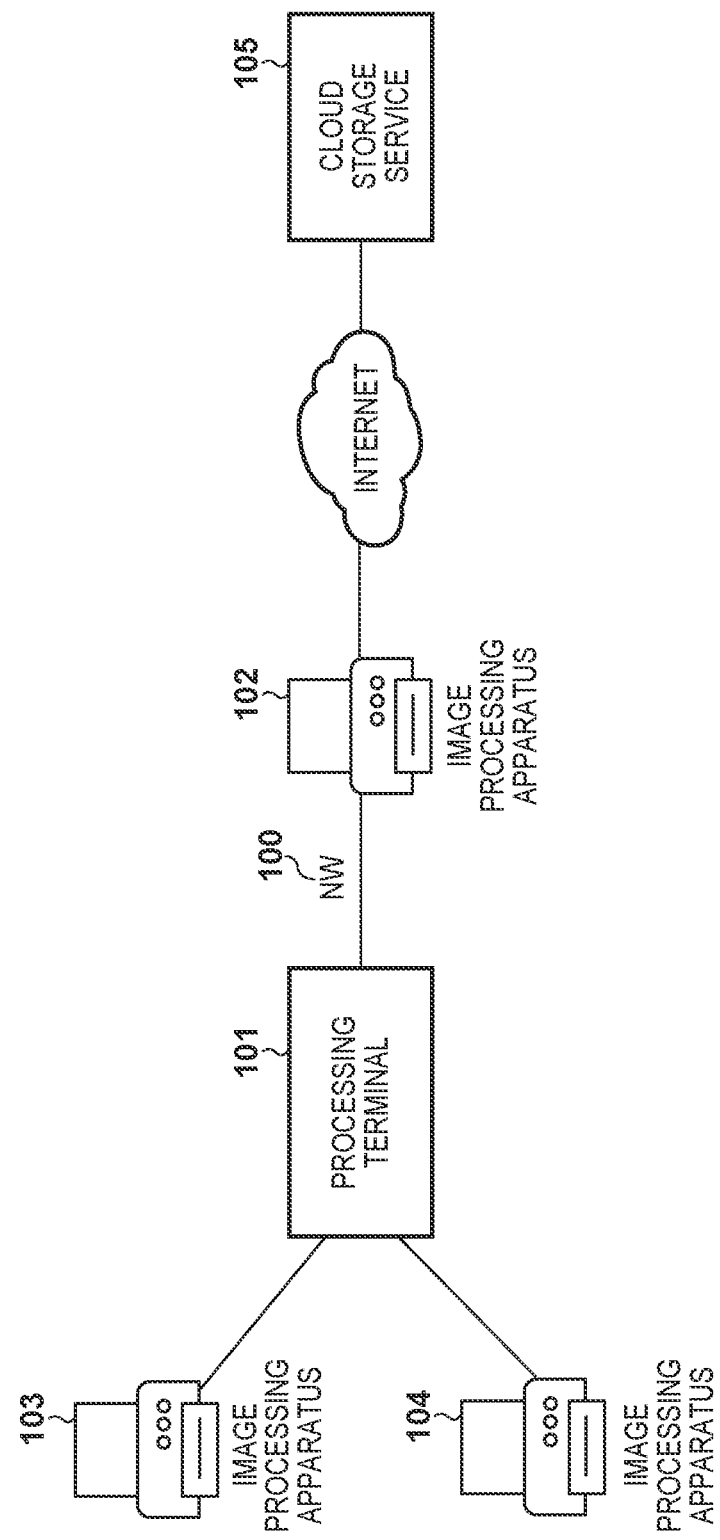

FIG. 2A EXAMPLE OF mDNS SEARCH REQUEST PACKET FROM PROCESSING TERMINAL mDNS Query Queries
- _scan._tcp.local : type SRV
- _scans._tcp.local : type SRV

FIG. 2B EXAMPLE OF mDNS SEARCH RESPONSE PACKET FROM IMAGE PROCESSING APPARATUS FOR WHICH PLAINTEXT AND ENCRYPTED COMMUNICATION ARE BOTH ENABLED mDNS Response Answers
- Canon MFP104._scan._tcp.local: type SVR, class IN, port 80, target CanonMFP104
- Canon MFP104._scans._tcp.local: type SVR, class IN, port 443, target CanonMFP104

FIG. 2C EXAMPLE OF mDNS SEARCH RESPONSE PACKET FROM IMAGE PROCESSING APPARATUS FOR WHICH ONLY PLAINTEXT COMMUNICATION IS ENABLED mDNS Response Answers
- Canon MFP102._scan._tcp.local: type SVR, class IN, port 80, target CanonMFP102

FIG. 2D EXAMPLE OF mDNS SEARCH RESPONSE PACKET FROM IMAGE PROCESSING APPARATUS FOR WHICH ONLY ENCRYPTED COMMUNICATION IS ENABLED mDNS Response Answers
- Canon MFP105._scans._tcp.local: type SVR, class IN, port 443, target CanonMFP103

FIG. 3A

SCAN START REQUEST FROM CLIENT TERMINAL TO IMAGE FORMING APPARATUS

```
POST /ScanJobs HTTP/1.1
Host: 192.168.1.100
Content-Type: text/xml
Content-Length: 100
<?xml version="1.0" encoding="UTF-8"?>
<scan:ScanSettings>
<scan:Intent>Photo</scan:Intent>
<pwg:ScanRegion>
<pwg:Height>1000</pwg:Height>
<pwg:Width>500</pwg:Width>
</pwg:ScanRegion>
<pwg:InputSource>Platen</pwg:InputSource>

<scan:ScanDestinations>
<dest:HttpDestination>
<pwg:DestinationUri>https://Ganon.storage.com/account/user1</pwg:DestinationUri>
<pwg:JobOriginatingUserName>Bob</pwg:JobOriginatingUserName>
<pwg:JobPassword>7654321</pwg:JobPassword>
<dest:HttpMethod>POST</dest:HttpMethod>
<dest:httpHeaders>
<dest:HttpHeader>Cookie: token=abcd</dest:HttpHeader>
</dest:httpHeaders>
</scan:ScanDestinations>
</scan:ScanSettings>
```

FIG. 3B

SCAN START RESPONSE FROM IMAGE FORMING APPARATUS TO CLIENT TERMINAL

```
HTTP/1.1 201 Created
Location: http://192.168.1.100/ScanJobs/123a4bcd-5678-abad-99aa-a12345b6789a
```

FIG. 3C CONNECTION REQUEST FROM IMAGE FORMING APPARATUS TO CLOUD STORAGE SERVICE

```
POST /account/user1 HTTP/1.1
Host: Ganon.storage.com:443
Authentication: Basic 7654321
Cookie: token=abcd
Content-Type: application/pdf
Content-Length: 1000
... PDF binary data ...
```

FIG. 3D CONNECTION RESPONSE FROM CLOUD STORAGE SERVICE TO IMAGE FORMING APPARATUS

```
HTTP/1.1 200 OK
```

FIG. 3E SCAN JOB STATUS QUERY REQUEST FROM PROCESSING TERMINAL TO IMAGE FORMING APPARATUS

```
GET /ScannerStatus HTTP/1.1
Host: 192.168.1.100
```

FIG. 3F SCAN JOB STATUS QUERY RESPONSE FROM IMAGE FORMING APPARATUS TO PROCESSING TERMINAL

```
HTTP/1.1 200 OK
Content-Type: text/xml
Content-Length: 100
<?xml version="1.0" encoding="UTF-8"?>
<scan:ScannerStatus>
<pwg:State>Idle</pwg:State>
<scan:Jobs>
<scan:JobInfo>

<pwg:JobUri>/ScanJobs/123a4bcd-5678-abad-99aa-a12345b6789a</pwg:JobUri>
<pwg:JobUuid>123a4bcd-5678-abad-99aa-a12345b6789a</pwg:JobUuid>
<pwg:JobState>Completed</pwg:JobState>
<pwg:JobStateReason>JobCompletedSuccessfully</pwg:JobStateReason>

<scan:DestinationStatus>
<scan:TransferState>Completed</scan:TransferState>
<scan:TransferStateReason>JobCompletedSuccessfully</scan:TransferStateReason>
</scan:DestinationStatus>

</scan:JobInfo>
</scan:Jobs>
</scan:ScannerStatus>
```

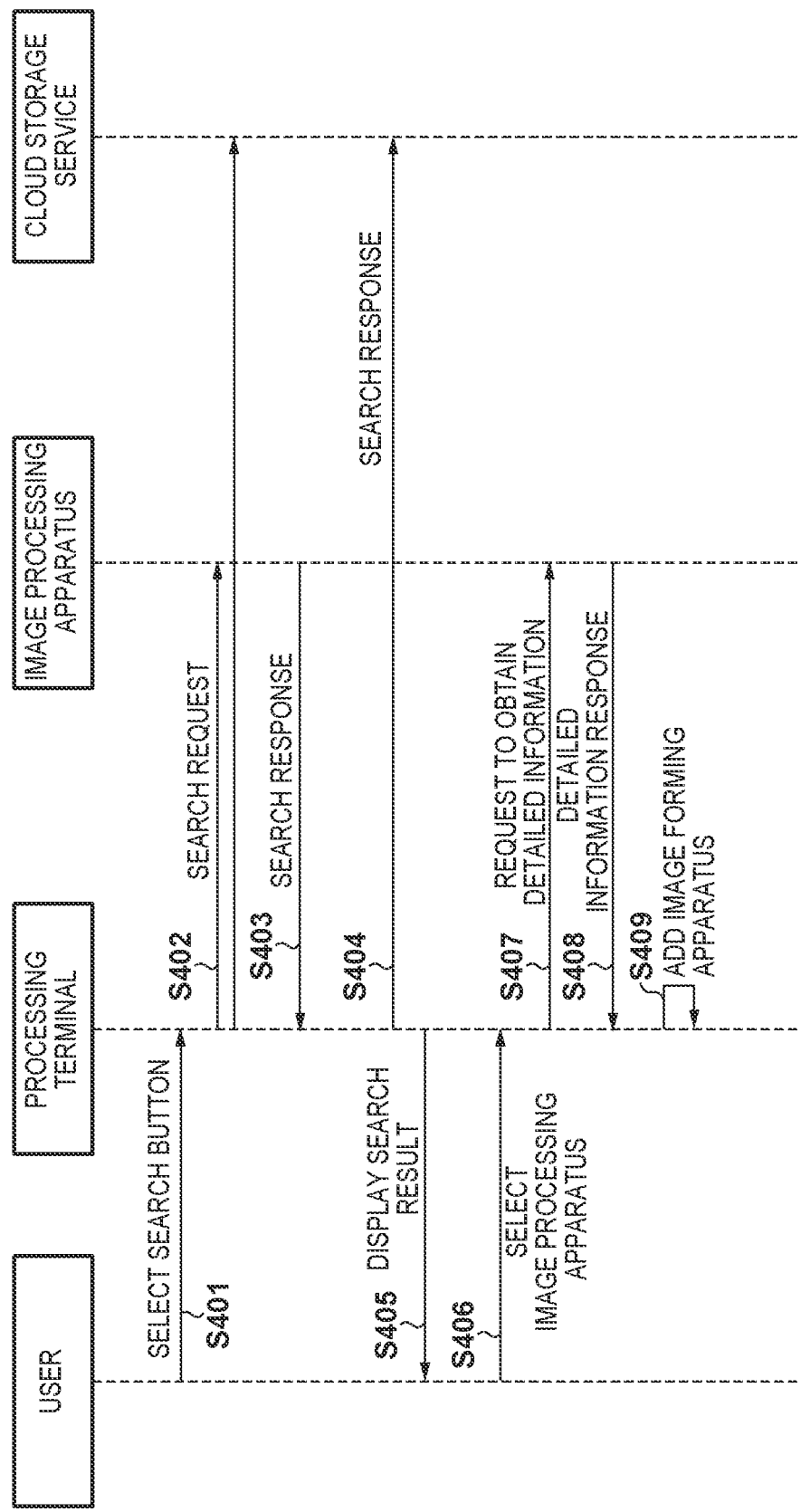

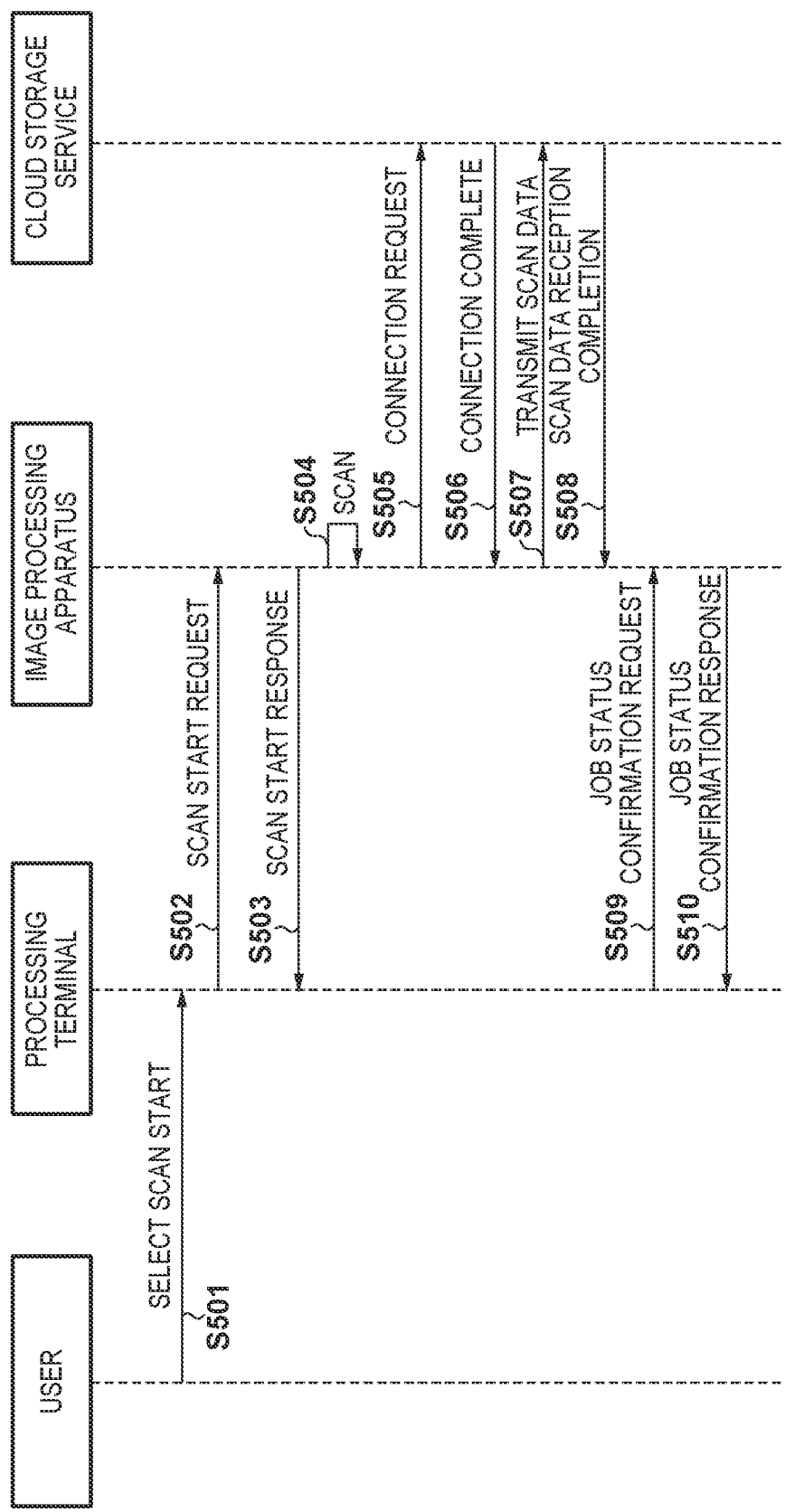

EXAMPLE OF mDNS SEARCH RESPONSE PACKET FROM IMAGE PROCESSING APPARATUS FOR WHICH ENCRYPTED PULL AND PUSH COMMUNICATION ARE ENABLED mDNS Query Queries
- _scan._tcp.local : type SRV
- _scans._tcp.local : type SRV
- _pushscan._tcp.local : type SRV
- _pushscans._tcp.local : type SRV
- _pullscan._tcp.local : type SRV
- _pullscans._tcp.local : type SRV

FIG. 17A

EXAMPLE OF mDNS SEARCH REQUEST PACKET FROM PROCESSING TERMINAL mDNS Response

Answers
- Ganon MFP102_pullscan._tcp.local: type SVR, class IN, port 80, target GanonMFP102

FIG. 17B

EXAMPLE OF mDNS SEARCH RESPONSE PACKET FROM IMAGE PROCESSING APPARATUS FOR WHICH ONLY PLAINTEXT PULL COMMUNICATION IS ENABLED mDNS Response Answers
- Ganon MFP102_pullscans._tcp.local: type SVR, class IN, port 443, target GanonMFP102
- Ganon MFP102_pushscans._tcp.local: type SVR, class IN, port 443, target GanonMFP102

FIG. 17C

INFORMATION PROCESSING APPARATUS THAT ENABLES AN INSTRUCTION FOR A PUSH SCAN WHEN A CONDITION IS SATISFIED, IMAGE PROCESSING APPARATUS, INFORMATION PROCESSING METHOD, AND STORAGE MEDIUM

BACKGROUND OF THE INVENTION

Field of the Invention

The present invention relates to an information processing apparatus, an image processing apparatus, an information processing method, and a storage medium.

Description of the Related Art

In recent years, a configuration in which a push scan request is transmitted from a client terminal to a scanner terminal and scanned data is transmitted from the scanner terminal to an external terminal has begun to become widespread (Japanese Patent Laid-Open No. 2017-112508). In such a system, first, a user sets an original in a scanner terminal, specifies a destination, a storage location, a scan resolution, and other settings for storing scan results from a client terminal, and selects to start a scan. Designated information and a scan start instruction are transmitted from the client terminal to the scanner terminal, and the scanner terminal, after having received the information, performs the scan. After that, the scanner terminal connects to a designated destination terminal and transmits the scanned data.

Although various methods have been proposed for such scanning protocols, HTTP-based IPP Scan (PWG 5100.17) and eSCL protocols have become popular. In addition, a search protocol such as mDNS (RFC 6762) is commonly used as a protocol for retrieving and registering a scanner terminal in a client terminal.

SUMMARY OF THE INVENTION

According to one embodiment of the invention, an information processing apparatus which executes an application which uses a predetermined protocol that supports a scanning method for both an instruction for a pull scan and an instruction for a push scan over a network, the apparatus comprises: a controlling unit configured to, in a case where a condition related to at least any of a mode of communication with an image processing apparatus, a form of a connection with an image processing apparatus, and an authorization level of communication with an image processing apparatus is satisfied, enable an instruction for a push scan to the image processing apparatus; and a sending unit configured to transmit to the image processing apparatus a credential to be used in transmission processing in a push scan, wherein the controlling unit, in a case where a condition related to at least any of the mode of communication, the connection form, and the authorization level is not satisfied, controls to not perform an instruction for a push scan to the image processing apparatus.

According to another embodiment of the invention, an image processing apparatus which accepts an instruction from an information processing apparatus an application which uses a predetermined protocol that supports a scanning method for both an instruction for a pull scan and an instruction for a push scan over a network, the image processing apparatus comprises: a determination unit configured to determine whether or not communication with the information processing apparatus is encrypted; and a sending unit configured to transmit information indicating whether or not a push scan is possible in the information processing apparatus in accordance with whether or not the communication is encrypted.

According to still another embodiment of the invention, an image processing apparatus which accepts an instruction from an information processing apparatus by an application which uses a predetermined protocol that supports a scanning method for both an instruction for a pull scan and an instruction for a push scan over a network, the image processing apparatus comprises: a first setting unit configured to set whether or not to encrypt communication with the information processing apparatus; and a second setting unit configured to set whether or not to enable a push scan in accordance with the setting as to whether or not to encrypt the communication.

According to yet another embodiment of the invention, an information processing method performed by an information processing apparatus which executes an application which uses a predetermined protocol that supports a scanning method for both an instruction for a pull scan and an instruction for a push scan over a network, the information processing method comprises: enabling, in a case where a condition related to at least any of a mode of communication with an image processing apparatus, a form of a connection with an image processing apparatus, and an authorization level of communication with an image processing apparatus is satisfied, an instruction for a push scan to the image processing apparatus; and transmitting to the image processing apparatus a credential to be used in transmission processing in a push scan, wherein the enabling, in a case where a condition related to at least any of the mode of communication, the connection form, and the authorization level is not satisfied, controls to not perform an instruction for a push scan to the image processing apparatus.

According to still yet another embodiment of the invention, an information processing method performed by an image processing apparatus which accepts an instruction from an information processing apparatus by an application which uses a predetermined protocol that supports a scanning method for both an instruction for a pull scan and an instruction for a push scan over a network, the information processing method comprises: determining whether or not communication with the information processing apparatus is encrypted; and transmitting information indicating whether or not a push scan is possible in the information processing apparatus in accordance with whether or not the communication is encrypted.

According to yet still embodiment of the invention, an information processing method performed by an image processing apparatus which accepts an instruction from an information processing apparatus by an application which uses a predetermined protocol that supports a scanning method for both an instruction for a pull scan and an instruction for a push scan over a network, the information processing method comprises: setting whether or not to encrypt communication with the information processing apparatus; and setting whether or not to enable a push scan in accordance with the setting as to whether or not to encrypt the communication.

According to still yet another embodiment of the invention, a non-transitory computer-readable storage medium stores a program which, when executed by a computer comprising a processor and a memory, executes an application which uses a predetermined protocol that supports a scanning method for both an instruction for a pull scan and an instruction for a push scan over a network, and causes the computer to: enable, in a case where a condition related to at least any of a mode of communication with an image processing apparatus, a form of a connection with an image processing apparatus, and an authorization level of communication with an image processing apparatus is satisfied, an instruction for a push scan to the image processing apparatus; and transmit to the image processing apparatus a credential to be used in transmission processing in a push scan, wherein control, in a case where a condition related to at least any of the mode of communication, the connection form, and the authorization level is not satisfied, to not perform an instruction for a push scan to the image processing apparatus.

Further features of the present invention will become apparent from the following description of exemplary embodiments (with reference to the attached drawings).

BRIEF DESCRIPTION OF THE DRAWINGS

FIG. 1 is a diagram illustrating an exemplary system including a processing terminal according to a first embodiment of the present invention.

FIGS. 2A through 2D are diagrams illustrating examples of packets transmitted/received by the processing terminal according to the first embodiment.

FIGS. 3A through 3F are diagrams illustrating examples of requests transmitted by the processing terminal according to the first embodiment and responses thereto.

FIG. 4 is a flowchart illustrating an example of a search process in the system according to the first embodiment.

FIG. 5 is a flowchart illustrating an example of a scan process in the system according to the first embodiment.

FIGS. 17A through 17C are diagrams illustrating examples of requests transmitted by the processing terminal according to a fifth embodiment and responses thereto.

DESCRIPTION OF THE EMBODIMENTS

Figure 6:
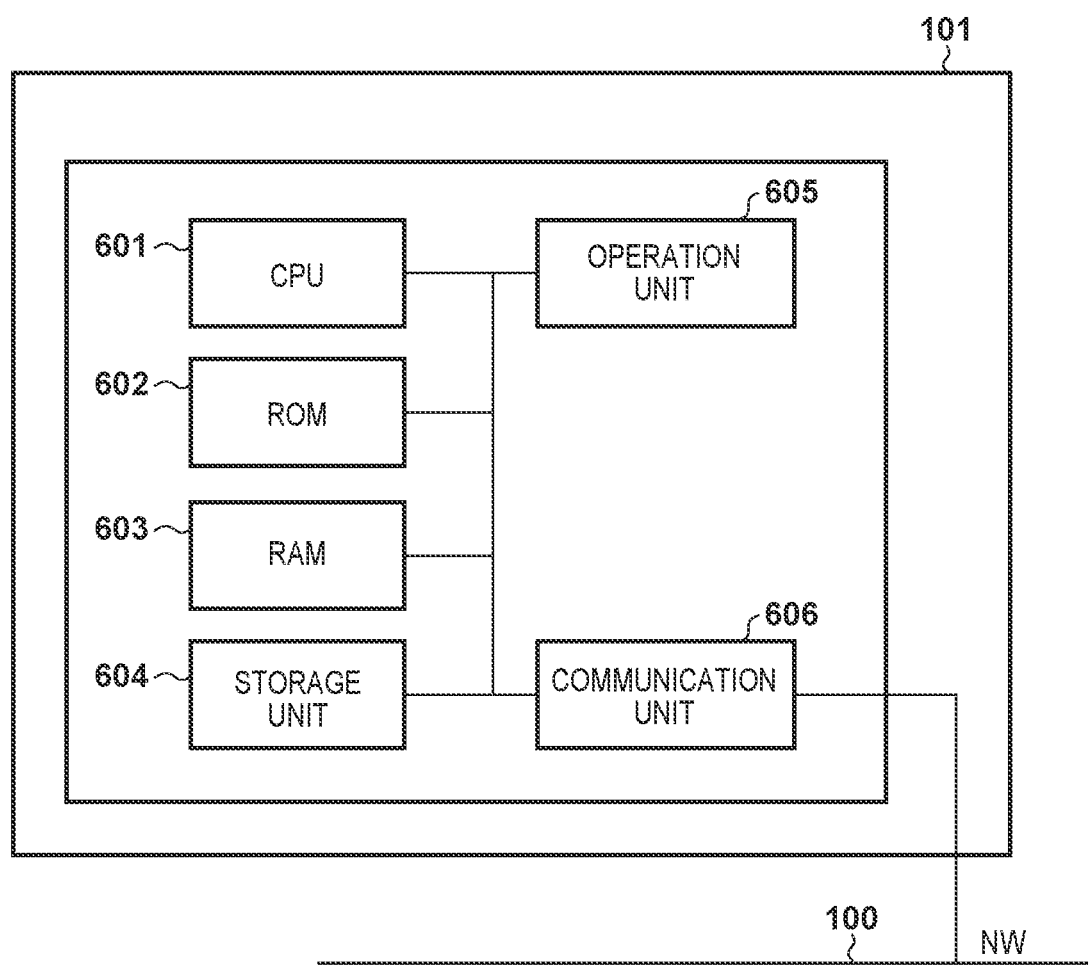
FIG. 6 is a block diagram illustrating an example of a hardware configuration of the processing terminal according to the first embodiment.

As destinations for storing scan data, various external terminals such as servers in the same LAN, the self terminal which has instructed the scan, and storage of a cloud service can be specified. Authentication is required for the scanner terminal to connect to these external terminals, and the authentication information is also transmitted from the client terminal to the scanner terminal together with the scan start instruction request. Authentication information is information such as a token, a user name, and a password, for example. However, if the communication path to the scanner terminal from the client terminal is not encrypted, there is a risk that such authentication information will be eavesdropped. When the authentication information is eavesdropped, there is a problem that the user may be spoofed, the external terminal accessed, and confidential data stored in the storage extracted and leaked.

One embodiment of the present invention prevents authentication information from being eavesdropped when the processing terminal transmits a scan instruction including authentication information.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating an example of a configuration of a printing system including a processing terminal 101 which is an information processing apparatus according to the present embodiment. The printing system includes a processing terminal 101, image processing apparatuses 102 to 104 equipped with a scanning function, and a cloud storage service (the service) 105. The processing terminal 101 communicates via a network 100 with the image processing apparatuses 102 to 104 that reside in the same LAN. The network 100 can transmit and receive data between the processing terminal 101 and the image processing apparatuses 102 to 104, and any physical layer communication method may be adopted. The image processing apparatuses 102 to 104 provide a scanning function and communicate with the service 105 on the Internet via a communication network or cellular network. Hereinafter, when simply referred to as an image processing apparatus, any one of the image processing apparatuses 102 to 104 is used.

The network 100 may be, for example, a communication network such as a LAN or WAN, a cellular network (e.g., LTE or 5G), or a wireless network that is compliant with IEEE 802.11, and may be configured by combining these communications. The processing terminal 101 may be any terminal, such as a desktop personal computer, a tablet, or a mobile phone terminal, that can be operated by acquiring input from a user. The image processing apparatus 102 is not particularly limited as long as it has a scan function, and may be, for example, a device of a single scanner or a multi-function peripheral having a print function.

The processing terminal 101 according to the present embodiment transmits a push scan start request to the image processing apparatus through the network 100 and executes a scan. Upon receiving the push scan start request, the image processing apparatus uses the authentication information included in the packet of the push scan start request to connect to the service 105 which is the designated external destination, and transmits the scanned data.

Push Scan

Next, transmission and reception of communication for a typical push scan will be described with reference to FIGS. 2 to 5. In the present embodiment, the push scan instruction described below is performed by communication in an HTTP protocol using XML, and a scanner terminal search is performed by the communication in an mDNS protocol. FIGS. 2A to 2D are views illustrating examples of requests and responses transmitted/received in the mDNS protocol.

FIG. 4 is a diagram illustrating an example of a sequence in which a user searches for an image processing apparatus by using the processing terminal 101 and registers the image processing apparatus in the processing terminal 101. In step S401, the user selects the "search" button from the operation screen of the processing terminal 101 to initiate the subsequent processing continuing from step S402. In step S402, the processing terminal 101 transmits a request (a search request) as illustrated in FIG. 2A to determine whether or not a terminal in which the scan service is enabled exists in the same link network using mDNS protocol as a multicast packet.

In the processing according to the present embodiment, a plaintext scan service protocol uses port number 80, and a TLS encrypted scan service protocol uses port number 443. When both plaintext communication and encrypted communication are enabled in communication with the processing terminal 101, the image processing apparatus, after receiving the search request, performs an mDNS response (search response) including both port number 80 and port number 443 as illustrated in FIG. 2B. In addition, as illustrated in FIG. 2C and FIG. 2D, the image processing apparatus, in which only one of them is enabled, performs a search response including the service of only the enabled one of port number 80 and port number 443. TLS is communication using TCP/IP, and if a setting for TLS is enabled, communication between the processing terminal 101 and the image processing apparatus 102 is encrypted; if it is disabled, plaintext communication is performed.

Step S403 to step S404 is a process in which the image processing apparatus that has received the search request from the processing terminal 101 returns a response. In this example, the image processing apparatus in step S403 transmits an mDNS response as illustrated in FIG. 2C to the processing terminal 101, and the image processing apparatus in step S404 transmits an mDNS response as illustrated in FIG. 2B or FIG. 2D. Following step S403 and step S404, the process proceeds to step S405.

In step S405, the processing terminal 101, after having received the search response, displays a list of image processing apparatuses that returned a search response on the display unit. In step S406, the processing terminal 101 acquires a desired selection from the list of image processing apparatuses by user input.

In step S407, the processing terminal 101 may transmit a request (detail request) for obtaining more detailed information to the image processing apparatus selected in step S406 in order to know what kind of scanning is possible. In step S408, the processing terminal 101 receives a response to the detailed request from the image processing apparatus. In step S409, the processing terminal 101 performs a process of registering the selected image processing apparatus in internal memory, stores information indicating the selected image processing apparatus in the storage area, and terminates the registration process. In the present embodiment, the information indicating the image processing apparatus for which the registration process is completed is stored in a volatile region of the processing terminal 101. This storage state is maintained even when the power of the processing terminal 101 is turned off, and can be referred to and operated by the user at an arbitrary timing.

FIG. 5 is a diagram illustrating an example of a sequence in which the processing terminal 101 performs a push scan instruction based on a user operation. In this example, the processing illustrated in FIG. 5 is performed after the image processing apparatus 102, in which only plaintext communication is enabled, is selected in step S406. In step S501, the user selects the scan start button from the operation screen of the processing terminal 101 with a scan image original set in advance in the image processing apparatus 102, and the processing following the subsequent step S402 is started.

In response to the selection of the scan start button in step S502, the processing terminal 101 transmits a scan start request as illustrated in FIG. 3A to the image processing apparatus 102. In step S503, the image processing apparatus 102 transmits a response to the scan start request to the processing terminal 101, as illustrated in FIG. 3B. In the example of FIG. 3A, the "DestinationURl" attribute indicates a destination of the push scan to which the scan data is to be stored by POST indicated in "HttpMethod". The example of FIG. 3A also illustrates the use of an attribute indicated by "JobPassword" as an authentication token when connecting to a destination. The destination of the (push) scan is a destination to which the scan data generated by the (push) scan is transmitted, and in the present embodiment, the service 105 is designated. The required authentication method differs in accordance with authentication settings of the destination, and, for example, OAuth authentication, DIGEST authentication, BASIC authentication, or the like are employed.

In step S504, the image processing apparatus 102 scans the original in response to receiving the scan start request. In step S505, the image processing apparatus 102 transmits a connection request to the destination specified in the scan start request (here, the service 105). Here, the image processing apparatus 102 adds the required authentication information and transmits a connection request as illustrated in FIG. 3C. The image processing apparatus 102 according to the present embodiment transmits a connection request including authentication information of BASIC authentication, but any authentication information corresponding to an authentication method such as a token for OAuth authentication may be used. In step S506, the image processing apparatus 102 receives a successful connection response from the service 105 for which the authentication was successful.

In step S507, the image processing apparatus 102 transmits scan data obtained by scanning an original to the service 105, and receives a response indicating completion of reception of the scan data in step S508. In addition, the processing terminal 101 periodically transmits a query request for the scan job status as illustrated in FIG. 3E to the image processing apparatus 102. Upon receiving the query request, the image processing apparatus 102 transmits a scan job status response as illustrated in FIG. 3F to the processing terminal 101, and when the job is stored normally in the destination, transmits a response indicating that the storage is completed to the processing terminal 101.

In this example, since only plaintext communication is enabled for the image processing apparatus 102, the exchange illustrated in FIG. 3A and FIG. 3B is performed in plaintext on the HTTP port 80. Therefore, since an authentication token or the like described above is transmitted as plaintext, there is a problem in that the packet may be eavesdropped and the authentication information may be leaked. Incidentally, eavesdropping is easy to prevent in the case of transmission and reception using encrypted communication of the HTTPS port 443.

Therefore, the processing terminal 101 determines whether or not a mode of communication with the image processing apparatus 102, the connection condition, or an authorization level satisfies a predetermined condition, and performs control so as not to enable an instruction for a push scan to the image processing apparatus 102 if the condition is not satisfied. Here, when the predetermined condition regarding the communication mode is not satisfied and the communication with the image processing apparatus 102 is not encrypted, the processing terminal 101 according to the present embodiment restricts the start of the push scan by the image processing apparatus 102. When communication with the image processing apparatus 102 is encrypted, the processing terminal 101 can transmit credentials to be transmitted to the service 105 in a push scan to the image processing apparatus 102 without restricting a push scan from being started. The credentials are authentication information required for user authentication such as BASIC authentication or DIGEST authentication, and are transmitted by the image processing apparatus 102 in the above-described step S505. The following description assumes that a user name and a password are used as the authentication information.

Further, as a case where the predetermined condition related to the connection condition is satisfied, the processing terminal 101 does not restrict the start of the push scan when the communication path with the image processing apparatus 102 is a P2P connection of a wireless LAN such as with WiFi Direct. This is because, in the P2P connection of the wireless LAN, since other terminals cannot participate in the connection and the wireless LAN layer is used, there is less risk of eavesdropping even if the plaintext communication of HTTP is performed.

FIG. 6 is a block diagram illustrating an example of the hardware configuration of the processing terminal 101. The processing terminal 101 includes a CPU 601, a ROM 602, a RAM 603, a storage unit 604, an operation unit 605, and a communication unit 606. The CPU 601 directly or indirectly controls each device (such as the ROM and the RAM) connected by an internal device and executes a program for implementing the invention. The ROM 602 is a read-only storage device that stores programs executed by the CPU 601 and stores BIOS as firmware. The RAM 603 functions as the main memory or work memory of the CPU 601 and is utilized to load software modules for implementing the invention. The storage unit 604 is a storage area and is, for example, a hard disk drive (HDD) or a solid state drive (SSD) in which an OS or a software module that is basic software is stored. The operation unit 605 functions as a display unit for displaying information to the user and a reception unit for receiving an instruction from the user. The operation unit 605 is, for example, a liquid crystal display unit having a touch panel function or a display having various hard keys.

The CPU 601 controls the display of information and the reception of user operations in cooperation with the operation unit 605. The communication unit 606 is an interface for the processing terminal 101 to connect to the network. The communication unit 606 according to the present embodiment is assumed to be a communication interface that performs wired communication based on Ethernet (registered trademark), but is not particularly limited thereto as long as communication is enabled. The communication unit 606 may be, for example, a wireless communication interface conforming to IEEE 802.11 series. The communication unit 606 may perform communication as a wireless communication interface. Further, for example, the communication unit 606 may perform communication by a 3G line such as CDMA, a 4G line such as LTE, or mobile communication such as 5G NR. Although the respective processes performed by the CPU 601 according to the present embodiment are described as being realized by the processing terminal 101 which is dedicated hardware, some or all of the processes may be performed by a separate computer.

Figure 7:
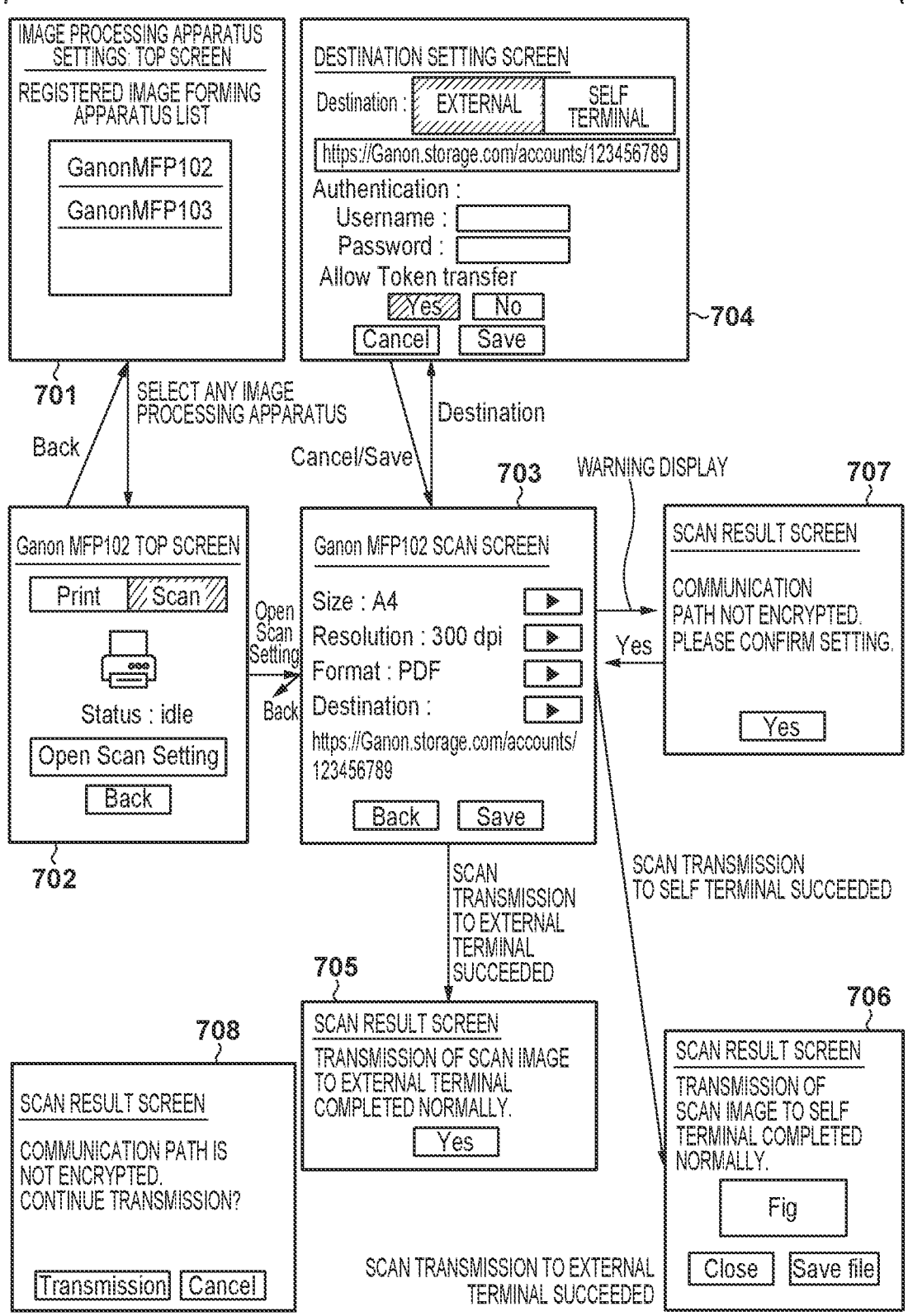
FIG. 7 is a diagram illustrating an example of a flow of processing terminal screens and confirmation screens according to the first embodiment.

Next, with reference to FIGS. 7 to 9, a control process by the processing terminal 101 according to the present embodiment for restricting the start of the push scan in an unencrypted plaintext communication mode will be described. FIG. 7 illustrates an example of a screen flow of the operation unit 605 displayed by the processing terminal 101 according to the present embodiment. Screen 701 is an example of a screen for displaying a list of image processing apparatuses registered in the processing terminal 101. When the user selects any terminal that the user wishes to use to perform a scan from the image processing apparatuses displayed on the screen 701, the screen transitions to the screen 702. The screen 702 is a main menu screen for the selected image processing apparatus, and displays a state of the image processing apparatus (for example, an idle state or a busy state) or a button for performing detailed setting for scanning. In this example, when the user presses on the button labeled "Open Scan Setting", a screen 703, which is a screen for performing detailed settings, is displayed. In the example of FIG. 7, the screen 703 is a screen for setting a size, a resolution, or a format for scanning, but any setting may be made as long as it is used for scanning such as a position of a start point of scanning or a feed direction of an original, for example.

When the user selects an item on the screen 703, the operation unit 605 displays a screen for performing detailed settings on the selected item. Screens 704 to 708 are examples of screens for settings corresponding to respective items selected on the screen 703. Screen 704 is a screen for setting the destination of the push scan. In the screen 704, it is possible to set whether the destination for storing the scan data is the self terminal or an external terminal, a path for storing the scan data, and authentication information necessary for connecting to the destination. The item "Destination" is displayed on the screen 704, and the setting of whether the destination is the self terminal or an external terminal and the setting of the detail (URL) when the destination is an external terminal are inputted. The screen 704 displays, as the authentication information, a form for inputting the authentication information for a user authentication request requiring a user name and a password, such as BASIC authentication or DIGEST authentication from the destination terminal. The authentication information may be set in advance, and when the image processing apparatus 102 transmits a request for user authentication to the processing terminal 101, a screen prompting input of the authentication information may be displayed as a pop-up on the operation screen of the processing terminal 101. Further, when the user authentication for the service 105 based on the authentication information has already been completed, an item for setting whether or not the token stored in the processing terminal 101 is transmitted to the image processing apparatus 102 may be provided on the screen 703. In this embodiment, various protocols such as HTTP, FTP, or SMB may be used as the protocol setting for connecting to the service 105, and parameters required for setting the destination (here, the service 105) may be optionally changeable.

Figure 8:
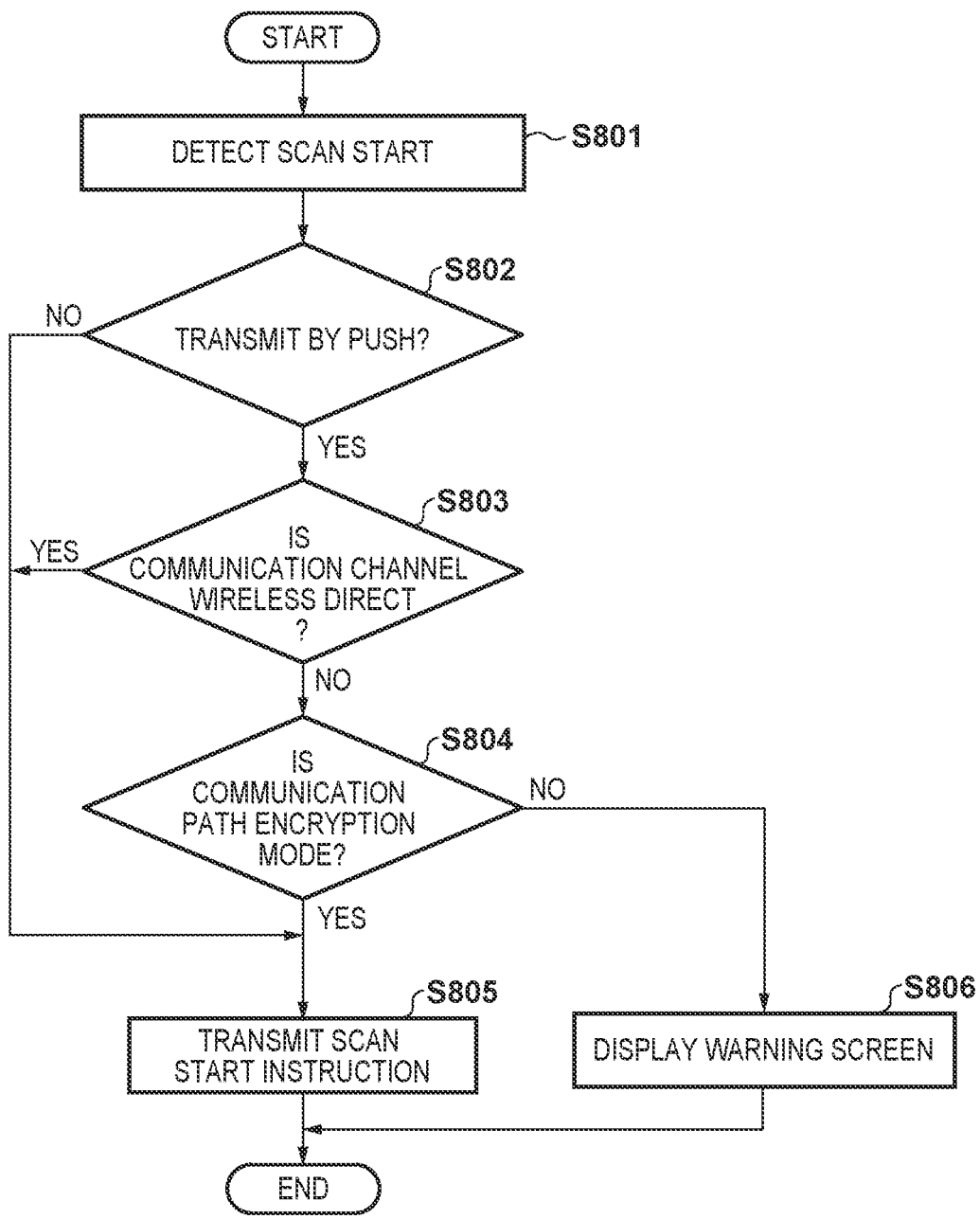
FIG. 8 is a flowchart illustrating an example of a scan process that the processing terminal performs according to the first embodiment.

FIG. 8 is a flowchart illustrating an exemplary process performed by the CPU 601 of the processing terminal 101 according to the present embodiment to restrict the start of push scanning by displaying a warning screen. When the "Scan" button is pressed in the screen 703, the CPU 601 of the processing terminal 101 starts the processing of step S801, and advances the processing to step S802.

In step S802, the CPU 601 determines whether scanning can be started. Here, the CPU 601 first determines whether the scanning process performed by the image processing apparatus 102 is a push scan or a pull scan. In the case of a pull scan, since the above-described exchange of authentication information is not required, the process proceeds to step S805 as the scanning can be started. In the case of a push scan, the process proceeds to step S803 in order to avoid leakage of the authentication information.

In step S803, the CPU 601 determines whether or not the communication path between the processing terminal 101 and the image processing apparatus 102 is a P2P connection using a wireless LAN such as WiFi Direct. If it is a P2P connection, it is assumed that scanning can be started, and the process proceeds to step S805. On the other hand, if it is not a P2P connection, such as an environment for communicating on a typical LAN connection, the process proceeds to step S804.

In step S804, the processing terminal 101 determines whether or not communication with the image processing apparatus 102 is encrypted. If the communication is not encrypted, such as in communication with an image processing apparatus 102 that supports only HTTP communication on port 80, the process proceeds to step S806. If the communication is encrypted, the process proceeds to step S805.

In step S805, the processing terminal 101 determines that communication with the image processing apparatus 102 is encrypted, transmits a request for instructing the image processing apparatus 102 to start the push scan as illustrated in FIG. 3A, and ends the processing. On the other hand, in step S806, the processing terminal 101 determines that the communication with the image processing apparatus 102 is not encrypted, presents a warning screen as illustrated on the screen 707 to the user, and terminates the processing. The processing terminal 101 may periodically check the job status of the scan and present a completion display such as a screen 705 or a screen 706 to the user when the storage of the scan data is completed after step S805. The screen 705 is a completion display for when the cloud 105 is an external device separate from the processing terminal 101, and the screen 706 is a completion display for when the destination of the scanning process is the processing terminal 101.

By such processing, it is possible to prevent information leakage by controlling whether or not to transmit a push scan start request packet including authentication information according to whether or not any of the communication mode for communication between the processing terminal and the image processing apparatus which is a scanner, the connection state between the processing terminal and the image processing apparatus, and the authorization level for communication between the processing terminal and the image processing apparatus satisfies a predetermined condition. In particular, when it is determined that the communication path between the processing terminal and the image processing apparatus is encrypted, it is possible to prevent leakage of authentication information by controlling not to transmit the scan start request packet.

Configuration may be such that the processing terminal 101 does not restrict the start of the push scan when the user agrees to transmit the authentication information to the service 105. That is, the process of starting the push scan may be continued according to the user's authorization that the authentication information may be transmitted in plaintext, such as when the processing terminal 101 and the image processing apparatus 102 are connected in a completely closed LAN. To this end, the processing terminal 101 can present a screen for confirming whether or not to continue the push scan process (for example, in the case where communication with the image processing apparatus 102 is not encrypted) to the user and acquire the selection. This processing is, for example, step S906 (FIG. 7B) of FIG. 9, which will be described later, and when it is approved to continue the processing of the scan, it is assumed that the authorization level of the communication satisfies the above-described predetermined condition, and the start of the push scan is not restricted. If it is not approved to continue the scan processing, it is determined that the authorization level of the communication does not satisfy the above-described predetermined condition, and the start of the push scan is restricted.

Figure 9:
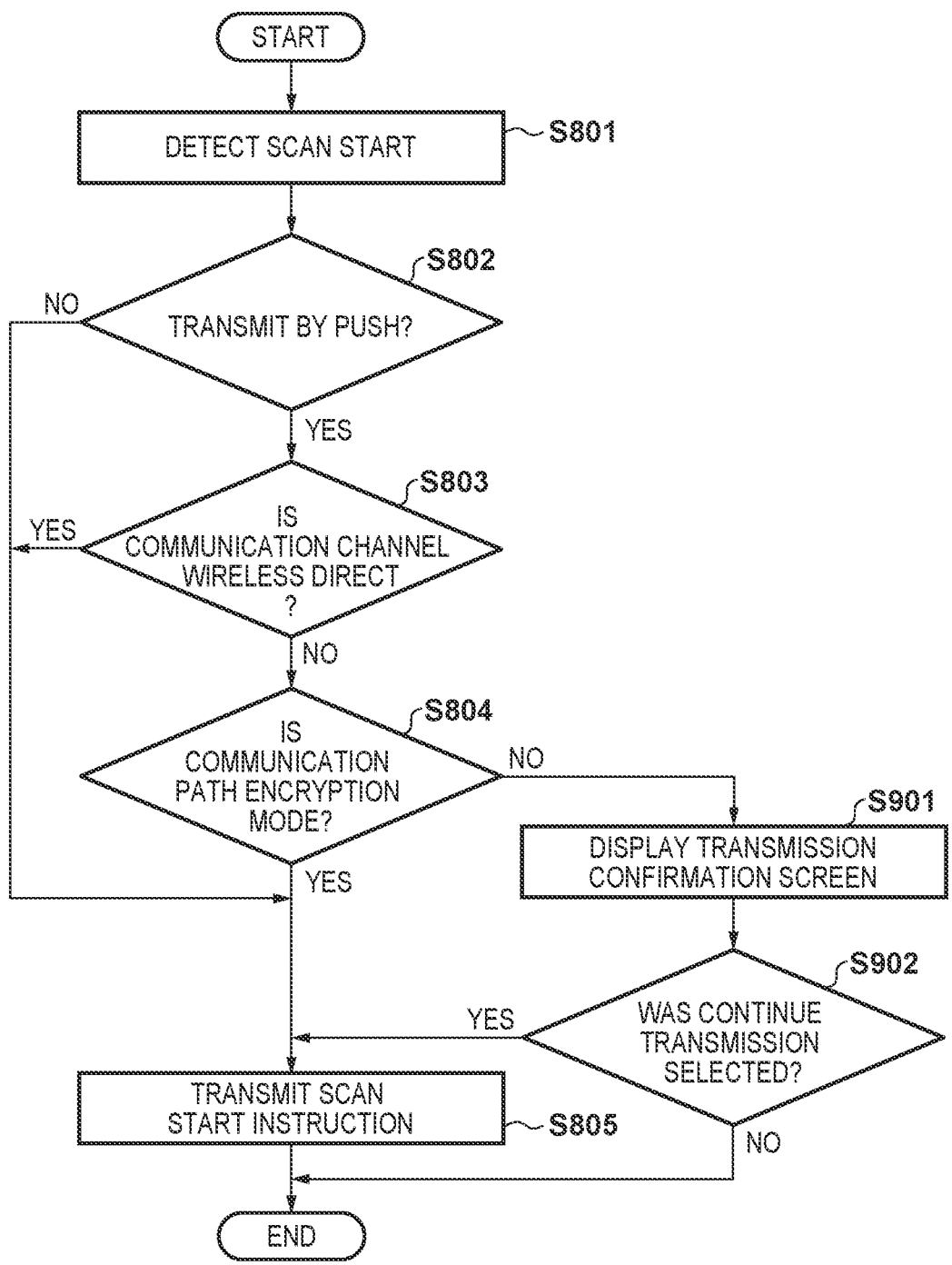
FIG. 9 is a flowchart illustrating an example of a confirmation process that the processing terminal performs according to the first embodiment.

FIG. 9 is a flowchart illustrating an exemplary process performed by the CPU 601 of the processing terminal 101 according to the present embodiment to display a screen for confirming whether to continue the push scan start process instead of the warning screen of FIG. 8, and to restrict the push scan start. In the processing illustrated in FIG. 9, the same processing as that illustrated in FIG. 8 is performed except that the processing of step S901 and step S902 is performed instead of step S806, and therefore, duplicated descriptions are omitted.

In step S901 performed when it is determined that the communication is not encrypted in step S804, the processing terminal 101 presents a confirmation screen to the user as to whether or not to continue the process for starting the push scan. In this example, a confirmation screen as illustrated in the screen 708 of FIG. 7B is displayed, and the user's selection of whether to continue or cancel the processing is acquired. In step S902, the processing terminal 101 determines whether the user's selection of the confirmation screen displayed in step S901 is to approve or cancel the continuation of the processing. When the continuation of the process is selected, the process transitions to step S805, and a push scan start instruction is performed. If cancellation of the process is selected, the process ends.

When the start of the push scan is limited, the processing terminal 101 may instead suggest the user to perform the pull scan. In the case of a pull scan, as described above, it is not necessary to exchange authentication information, so the risk of leakage of authentication information can be avoided even in the case of plaintext communication. In this example, the processing terminal 101 presents to the user a screen for selecting whether or not to perform a pull scan instead of displaying a warning screen at step S806.

Second Embodiment

The processing terminal 101, which is an information processing apparatus according to the second embodiment, performs control so as not to perform a push scan by the image processing apparatus by restricting the display of an image processing apparatus whose communication is not encrypted in the list of search results in the search processing of the image processing apparatus performed in step S401 to step S405 according to the first embodiment. Except for this series of processes, the processing terminal 101 according to the present embodiment performs basically the same processing as that of the first embodiment, and therefore, a duplicated description thereof is omitted.

Figure 11:
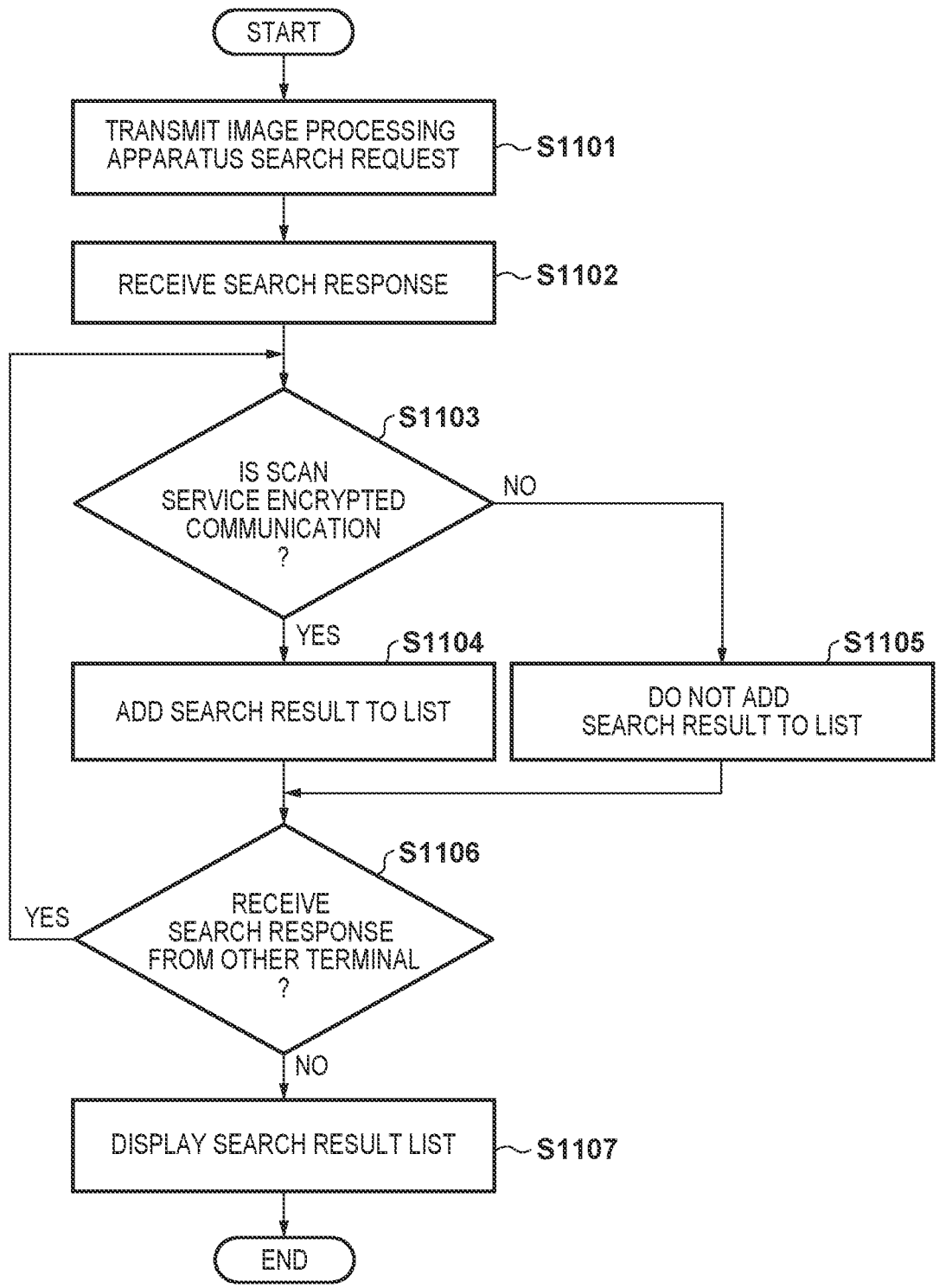
FIG. 11 is a flowchart illustrating an example of a search process that the processing terminal performs according to the second embodiment.

The processing terminal 101 according to the present embodiment restricts the display of an image processing apparatus whose communication is not encrypted by not displaying the image processing apparatus in the list of search results, or by confirming whether the image processing apparatus is actually to be registered when the image processing apparatus is selected from the list. FIG. 11, which will be described later, illustrates a flowchart for the case where a search result is not displayed in the list, and FIG. 12 illustrates a flowchart for the case where it is confirmed whether or not the registration is actually performed.

The processing terminal 101 according to the present embodiment searches for image processing apparatuses by transmitting the search request in a multicast packet in the same manner as in step S402, for example. Here, the processing terminal 101 refers to mDNS response of the image processing apparatus to the search request and determines whether or not communication with each of the retrieved image processing apparatus is encrypted. This is determined, for example, by referring to the port number from the responses as illustrated in FIGS. 2B to 2D. In the following example, the processing terminal determines whether or not push scanning is possible based on whether or not communication is encrypted, but the determination may use a condition based on the connection form or a condition based on the authorization level.

The processing terminal 101 can perform control so as not to display the image processing apparatus that is determined not to encrypt the communication at the time of retrieval in the list of search results. The processing terminal 101 displays all the search results in a list, and when the image processing apparatus to be registered is selected by the user, if communication with the image processing apparatus is not encrypted, it may present something to that effect and acquire a selection of whether or not to continue the registration (for example, a screen 1005). In this case, when communication with the selected image processing apparatus is encrypted, the selected image processing apparatus is registered in the list as a registered apparatus.

Figure 10:
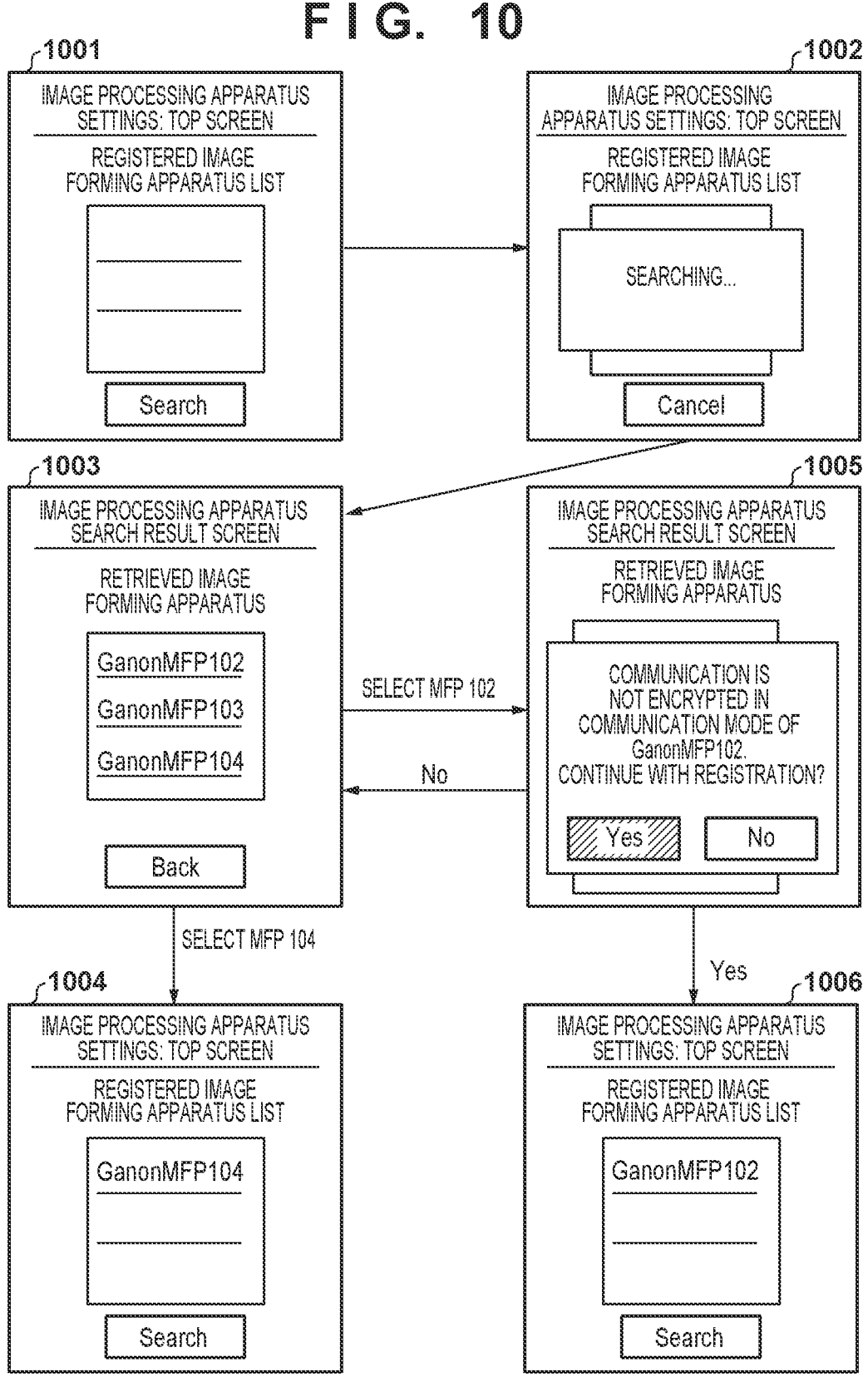
FIG. 10 is a view illustrating an example of a flow of registration screens that the processing terminal according to a second embodiment displays.
Figure 12:
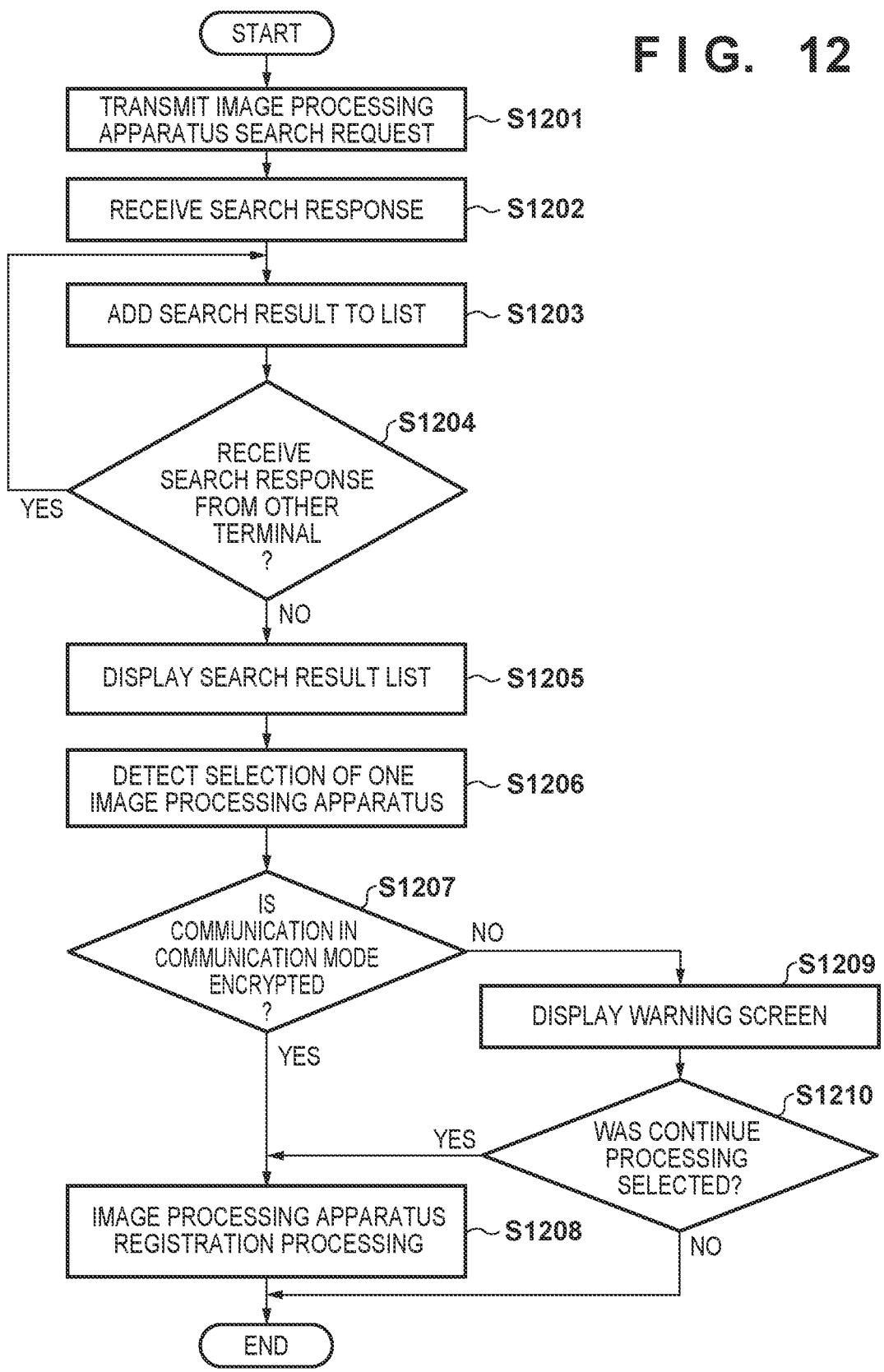
FIG. 12 is a flowchart illustrating an example of a registration process that the processing terminal performs according to the second embodiment.

FIGS. 10 to 12 are diagrams for explaining an example of processing performed by the processing terminal 101 according to the present embodiment at the time of searching for an image processing apparatus. FIG. 10 illustrates an example of a screen flow of the operation unit 605 displayed at the time of image processing apparatus search processing by the processing terminal 101 according to the present embodiment. FIG. 11 is a flowchart illustrating an exemplary process of restricting display when searching for an image processing apparatus, which is performed by the CPU 601 of the processing terminal 101 in the process as illustrated in FIG. 10.

Screen 1001 is an example of a screen for displaying a list of image processing apparatuses registered in the processing terminal 101. The operation unit 605 can search for and register a new image processing apparatus by acquiring an operation of the user on the screen 1001. In step S1101, the processing terminal 101 transmits the search request in a multicast packet. Here, when the user selects the "search" button on the screen 1001, the CPU 601 transmits an mDNS search packet as illustrated in FIG. 2A to the image processing apparatus, and the operation unit 605 performs a display indicating that the search is in progress as illustrated in the screen 1002.

In step S1102, the processing terminal 101 receives an mDNS response from each of the image processing apparatus that has performed the search. In step S1103, the processing terminal 101 determines whether or not the service of scanning the response packet uses encrypted communication. For an image processing apparatus that uses encrypted communication, step S1104 processing is performed, and for an image processing apparatus that does not use encrypted communication, step S1105 processing is performed. In step S1104, the processing terminal 101 adds an image processing apparatus using TLS encrypted HTTPS communication using the port 443 as illustrated in, for example, FIG. 2B and FIG. 2D to a list of search results as an apparatus in which communication is encrypted. On the other hand, in step S1105, the processing terminal 101 does not add an image processing apparatus that performs the HTTP communication scan service using the port 80 as illustrated in FIG. 2C as an unencrypted apparatus to the list of search results. When the processing of step S1104 or step S1105 is completed, the processing proceeds to step S1106, and after the processing of step S1103 to step S1105 is repeated until mDNS search response is completed, the processing proceeds to step S1107. In step S1107, the processing terminal 101 displays a list of search results of the image processing apparatus on the display screen. The processing terminal 101 displays, for example, the image processing apparatuses 103 and 104 excluding the image processing apparatus 102 supporting only plaintext communication in the list.

By such processing, it is possible to determine whether or not the path of communication with the processing terminal is encrypted at the time of retrieval of the image processing apparatus for registration. Therefore, by removing image processing apparatuses whose communication is not encrypted from the search result, it is possible to reduce the risk of leakage of authentication information.

On the other hand, FIG. 12 is a flowchart illustrating an exemplary process performed by the CPU 601 of the processing terminal 101 in the process as illustrated in FIG. 10, in which restrictions are performed after registering in the list of the searched image processing apparatuses. In step S1201, the processing terminal 101 transmits the search request in a multicast packet similarly to in step S1101. In step S1202, similarly to in step S1102, the processing terminal 101 receives an mDNS response from each of the image processing apparatus for which a search has been performed.

In step S1203, the processing terminal 101 adds each image processing apparatus that has returned an mDNS response to the list of search results. In step S1204, the processing terminal 101 determines whether or not the processing of step S1203 has been performed on all the image processing apparatuses that have returned mDNS responses. If the processing has been performed for all image processing apparatuses, the process proceeds to step S1205; otherwise, the process returns to step S1203. The processing terminal 101 generates and displays a list of the search results of the image processing apparatuses as illustrated in the screen 1003 in step S1205 after the reception of all the responses has been completed.

In step S1206, the processing terminal 101 acquires the selection by the user of the image processing apparatus to be registered from the list. In step S1207, the processing terminal 101 determines whether or not the communication between the image processing apparatus selected in step S1206 and the processing terminal 101 is encrypted in the same manner as in step S1103. If the communication with the selected image processing apparatus includes an encrypted scan service, the process proceeds to step S1208, and the processing terminal 101 adds the image processing apparatus to the registered list, and the process ends. On the other hand, if the selected image processing apparatus does not include an encrypted scan service, the process proceeds to step S1209.

In step S1209, the processing terminal 101 displays a screen for acquiring a user selection as to whether or not to continue the registration process even though the encrypted communication is not included, as illustrated in the screen 1005. In step S1210, the processing terminal 101 determines whether or not the user has selected to continue the registration process in step S1209. If continue is selected, the process proceeds to step S1208, and the processing terminal 101 adds the image processing apparatus to the registered list, and displays that the addition has been completed such as the screen 1006 to terminate the processing. If continuation is not selected, the registration process is canceled and the process ends.

By such processing, it is possible to determine whether or not the path of communication with the processing terminal is encrypted at the time of retrieval of the image processing apparatus for registration. Then, the risk of leakage of the authentication information can be reduced by checking whether or not an image processing apparatus whose communication is not encrypted is actually to be registered when the image processing apparatus is selected from the list.

Third Embodiment

In the printing system 100 according to the embodiment, push scanning in which the service 105 is used as a destination for a scan by the image processing apparatus 102 is performed. Meanwhile, when the image processing apparatus 102 performs a pull scan in which the destination of the scan data is the processing terminal 101, it is not necessary to include the authentication information in the scan start instruction. From this point of view, the processing terminal 101 which is the information processing apparatus according to the third embodiment determines whether or not the image processing apparatus 102 can perform a pull scan. Next, the processing terminal 101 issues an instruction to start a pull scan when the image processing apparatus 102 is capable of pull scanning, and issues an instruction to start push scanning when a pull scan is not possible.

The processing terminal 101 according to the present embodiment has the same configuration as that of the processing terminal 101 of the first embodiment except that when the image processing apparatus 102 is capable of a pull scan, the processing terminal 101 transmits a pull scan start instruction, and performs the same processing. Therefore, duplicate descriptions are omitted. In the present embodiment, the pull scan is a scan performed by the image processing apparatus 102 in response to a scan start instruction from the processing terminal 101, in which the storage destination of the scan data is the processing terminal 101.

Figure 13:
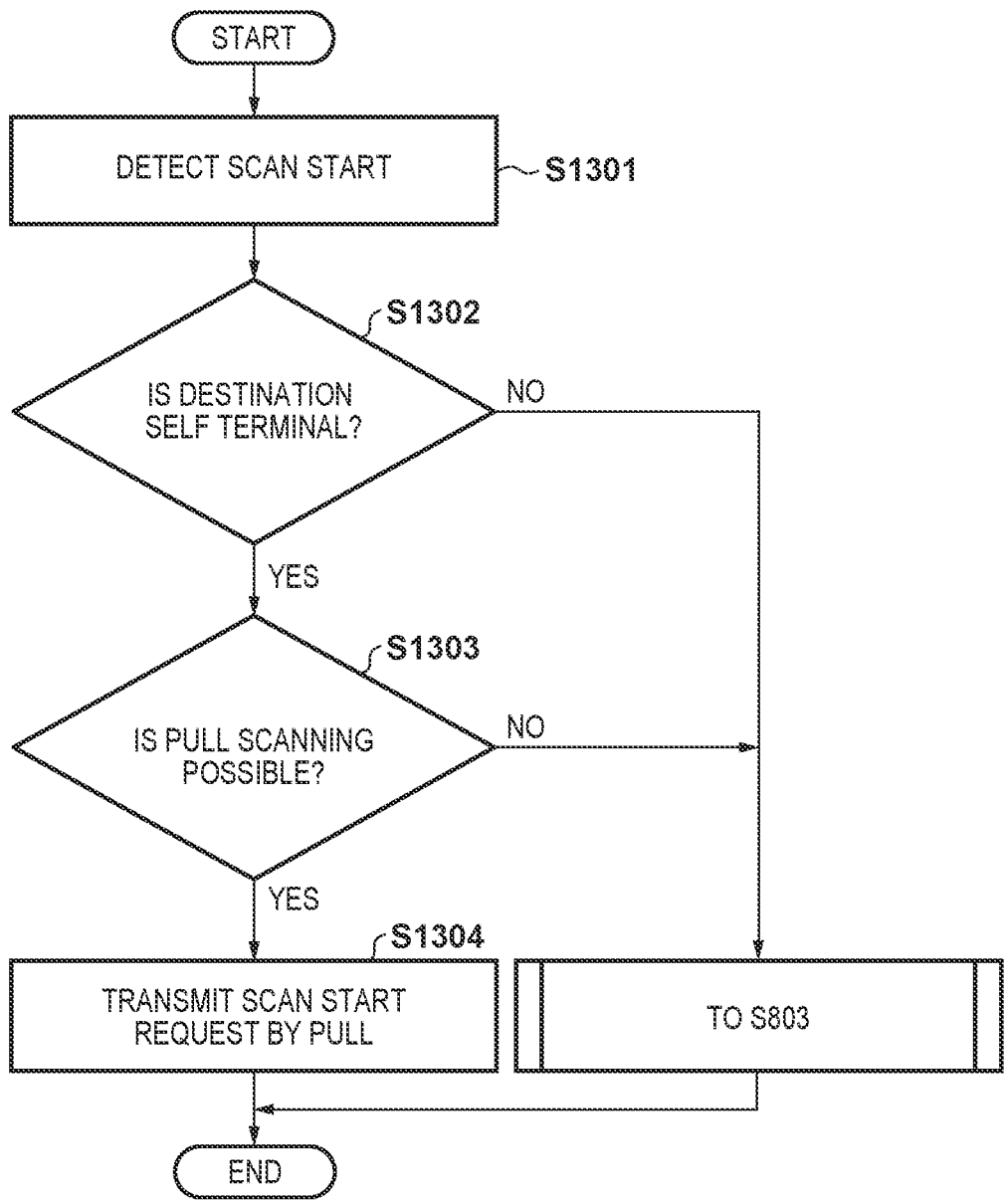
FIG. 13 is a flowchart illustrating an example of a scan process that the processing terminal performs according to a third embodiment.

FIG. 13 is a flowchart illustrating an example of transmission processing of a pull scan start request performed by the processing terminal 101 according to the present embodiment. The processing illustrated in FIG. 13 is started when an instruction to start scanning has been issued to the image processing apparatus 102 such as when the user presses a "Scan" button on the screen 703 of FIG. 7, for example.

In step S1301, the processing terminal 101 detects that the user has instructed the image processing apparatus 102 to start scanning. In step S1302, the processing terminal 101 determines whether the destination (storage destination) of the data of the scan by the image processing apparatus 102 is the self terminal, that is, the processing terminal 101, or an external terminal such as the service 105. Here, the processing terminal 101 makes the determination described above by referring to the item "Destination" inputted by the user on the screen 704 of FIG. 7. If the destination is the self terminal, the process proceeds to step S1303, otherwise the process proceeds to step S803 of FIG. 8 to perform subsequent processing on the push scan.

In step S1303, the processing terminal 101 determines whether or not the processing terminal 101 is capable of performing pull scanning. Here, it is determined whether or not the processing terminal 101 is equipped with a pull scan function, and whether or not the enabled/disabled setting is enabled when the pull scan function is provided. If the processing terminal 101 is capable of pull scanning as well, the process proceeds to step S1304, otherwise the process proceeds to step S803 of FIG. 8 to perform subsequent processing on the push scan. In step S1304, the processing terminal 101 transmits a start instruction to the image processing apparatus 102 to start scanning as a pull scan, and ends the processing.

According to such processing, when pull scanning is possible in the present system, pull scanning can be started. In a pull scan, data can be transmitted and received by plaintext HTTP communication because the scan start request does not include authentication information. Therefore, leakage of the authentication information can be prevented.

Fourth Embodiment

As illustrated in FIG. 2A, the processing terminal 101 according to the first embodiment searches for a terminal having a scan service without distinguishing between push scanning and pull scanning. On the other hand, the processing terminal according to the present embodiment performs search processing assuming that "pull scan service" and "push scan service" exist in addition to the conventional "scan service".

FIGS. 17A to 17C are examples of packets for mDNS service searching and response when "pull scan service" and "push scan service" exist in addition to "scan service". In comparison with the example of FIG. 2, pull scan and push scan services are added to a packet from the processing terminal and a response packet from the image processing apparatus, and an image processing apparatus that only supports a conventional scan service may return the same response as in the example of FIG. 2. FIG. 17B is an example of a packet response from an image processing apparatus that performs plaintext communication (port number 80) corresponding to a pull scan service. Also, FIG. 17C is an example of a packet response from an image processing apparatus that performs encrypted communication (port number 443) corresponding to both a pull scan service and a push scan service.

In the present embodiment, a search request is made in each of a pull scan and a push scan, and a response is made to each of them. Therefore, even in an image processing apparatus in which "Use TLS" is disabled and "Push" is enabled as described in the below-described fifth embodiment, for example, if pull scanning is possible, a response with information indicating something to that effect can be returned.

In the present system, the image processing apparatus transmits the search request from the processing terminal 101 including information as to whether or not a push scan is possible in the response. However, in consideration of prevention of leakage of authentication information, it is not necessary to indicate to the processing terminal 101 that a push scan can be performed when performing plaintext communication. For this reason, when communication with the processing terminal 101 is plaintext communication, the image processing apparatus according to the present embodiment does not transmit to the processing terminal information that a push scan is possible in response to a search request from the processing terminal 101. That is, information indicating that push scanning is not possible is transmitted as a response.

By such processing, the image processing apparatus side is configured to perform a service response by each of a push scan and a pull scan, so the appropriate service response using a pull scan can be performed.

Fifth Embodiment

An image processing apparatus 1600 according to the fourth embodiment performs push scanning in response to a push scan start instruction from the processing terminal 101, similarly to the image processing apparatus 102 of the first embodiment. In addition, the image processing apparatus 1600 sets (enables/disables) whether or not to perform encrypted communication and sets (enables/disables) whether or not to perform a push scan according to the setting. Here, the image processing apparatus 1600 is set so as not to perform a push scan when encrypted communication is set to be disabled. That is, by linking the setting of encrypted communication with the setting of availability of push scan and not performing push scan when encrypted communication is not performed, leakage of authentication information is prevented.

The image processing apparatus 1600 according to the present embodiment is implemented in a standard in which a "pull scan service" and a "push scan service" exist in addition to the "scan service" according to the fourth embodiment. Accordingly, the image processing apparatus 1600 returns a response based on the setting (enabled/disabled) of whether or not to perform the above-described encrypted communication and the setting (enabled/disabled) of whether or not to perform a push scan determined according to the setting in response to the search request from the processing terminal 101. However, the image processing apparatus 1600 is not particularly limited to the implementation in this standard, and a response generated in the conventional standard as illustrated in FIG. 2 of the first embodiment may be performed.

Figure 16:
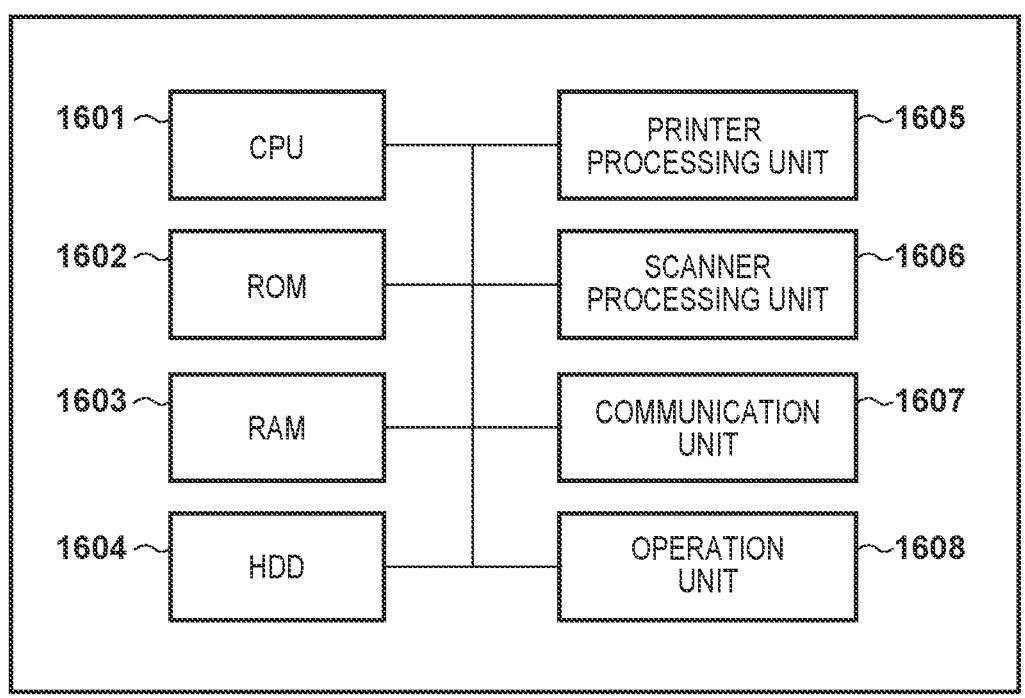
FIG. 16 is a block diagram illustrating an example of a hardware configuration of an image processing apparatus according to the fourth embodiment.

FIG. 16 is a block diagram illustrating an example of a hardware configuration of an image processing apparatus 1600 according to the present embodiment. The image processing apparatus 1600 includes a CPU 1601, a ROM 1602, a RAM 1603, a storage unit 1604, a printer processing unit 1605, a scanner processing unit 1606, a communication unit 1607, and an operation unit 1608. The CPU 1601 directly or indirectly controls each device (such as the ROM and the RAM) connected by an internal device and executes a program for implementing the invention. The ROM 1602 is a read-only storage device that stores programs executed by the CPU 1601 and stores BIOS as firmware. The RAM 1603 functions as the main memory or work memory of the CPU 1601 and is utilized to load software modules for implementing the invention. The storage unit 1604 is a storage area and is, for example, a hard disk drive (HDD) or a solid state drive (SSD) in which an OS or a software module that is basic software is stored. The scanner processing unit 1606 performs a process of reading and digitizing image files scanned by pressure plates or feeders. The printer processing unit 1605 controls copying or discharges an image printed on a designated image file in response to a print instruction from an external terminal. The operation unit 1608 functions as a display unit for displaying information to the user and a reception unit for receiving an instruction from the user. The operation unit 1608 is, for example, a liquid crystal display unit having a touch panel function or a display having various hard keys.

The CPU 1601 controls the display of information and the reception of user operations in cooperation with the operation unit 1608. The communication unit 1607 is an interface for the image processing apparatus 1600 to connect to the network. The communication unit 1607 according to the present embodiment is assumed to be a communication interface that performs wired communication based on Ethernet (registered trademark), but is not particularly limited thereto as long as communication is enabled. The communication unit 1607 can perform communication in the same manner as the communication unit 606 of the first embodiment.

Figure 14:
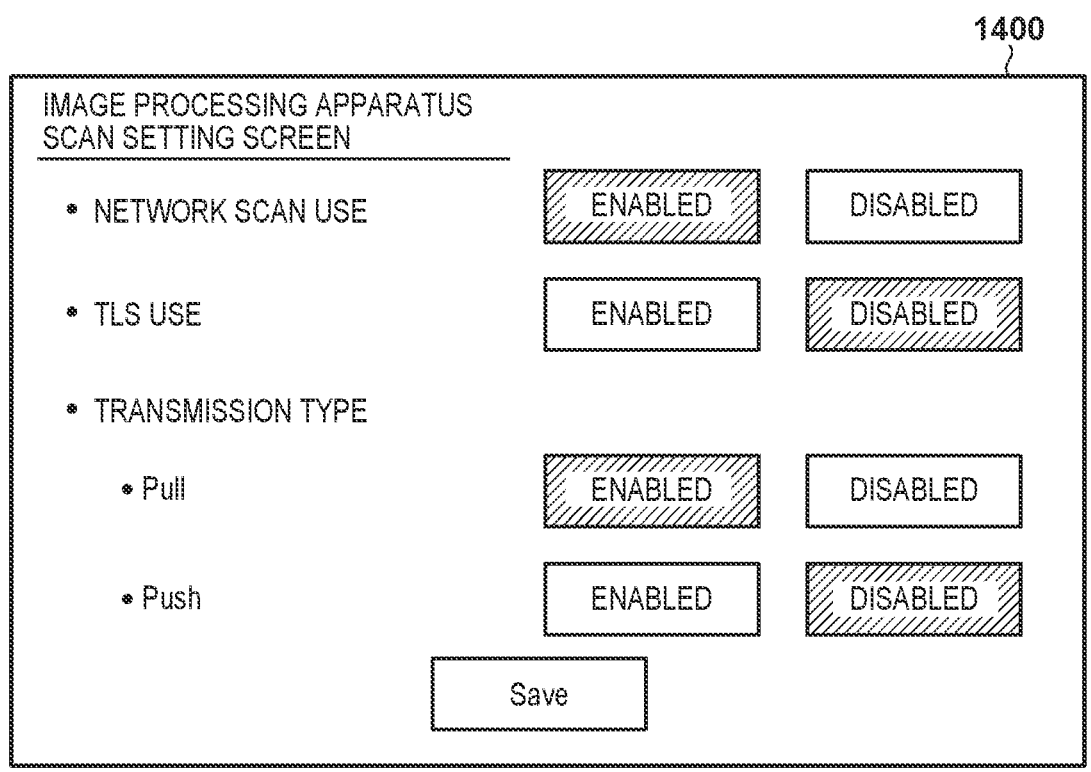
FIG. 14 is a view illustrating an example of a screen that the image processing apparatus according to the fourth embodiment displays.

FIG. 14 is an example of a scan setting screen displayed on the operation unit 1608 of the image processing apparatus 1600. The user performs desired scan settings via the screen 1400 illustrated in FIG. 14. In the screen 1400, an item of "use network scan" which is a setting for whether or not to use the network scan function is set. The transmission and reception of data over the network by application functions such as IPP scanning or eSCL scanning is enabled/disabled according to the enabled/disabled setting for network scanning use. Further, when the setting of "use TLS" in the screen 1400 is set to enabled/disabled, transmission and reception of data via plaintext communication using the port 80 of HTTP is set to enabled/disabled. That is, when "Use TLS" is set to be enabled, data is transmitted and received by plaintext communication. Further, in the screen 1400, as the type of the transmission type, "Pull" and "Push" are separately set to be enabled disabled. Here, the pull scan function of the image processing apparatus 1600 is enabled when "Pull" is set to be enabled, and the push scan function of the image processing apparatus 1600 is enabled when "Push" is set to be enabled. Either one of the setting of "Pull" or the selling of "Push" may be set to enabled, or both may be set to enabled. After the user selects the various scan settings, the CPU 1601 acquires the selected various settings and stores them in the storage unit 1604 by pressing the "SAVE" button.

Figure 15:
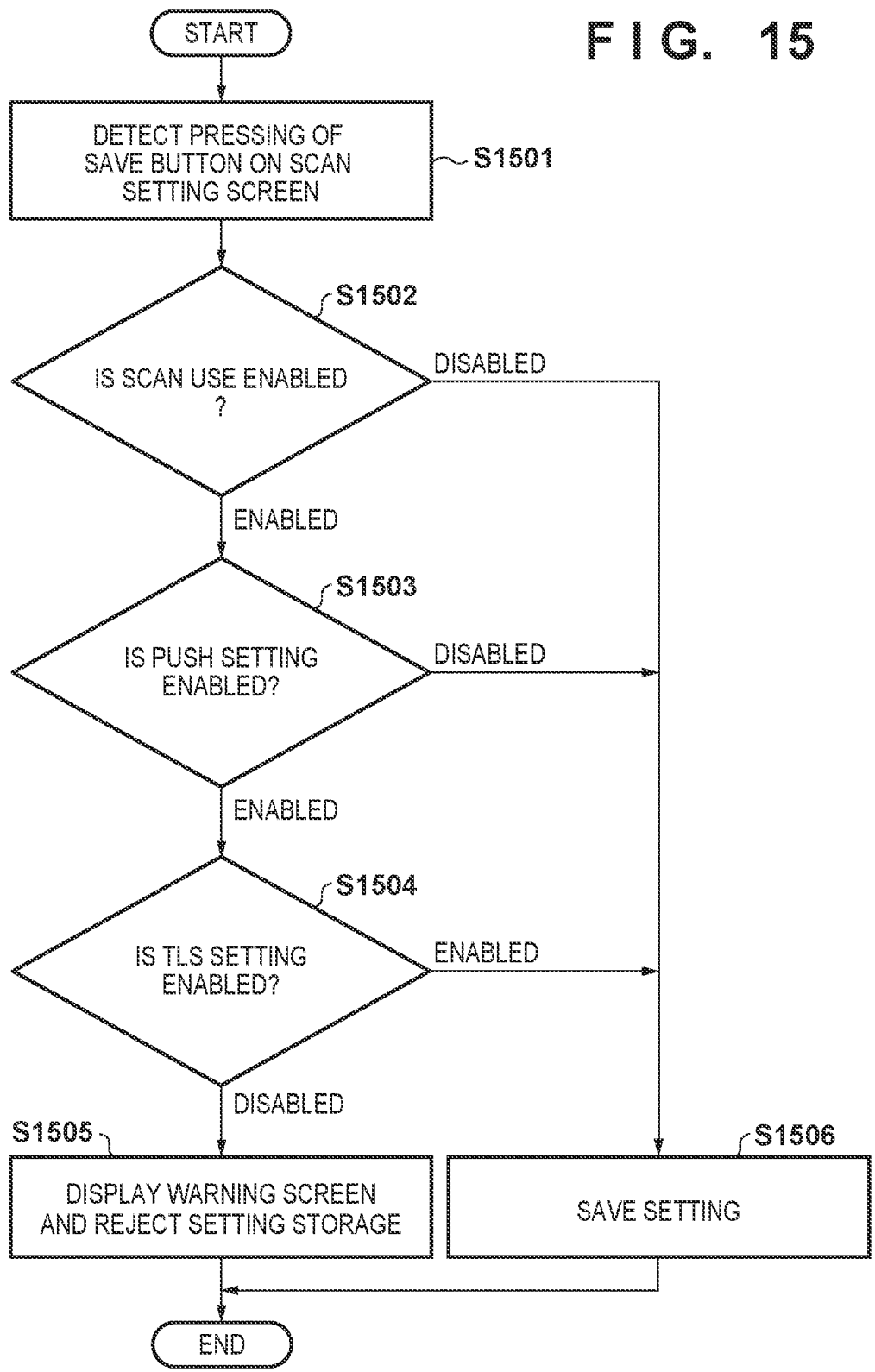
FIG. 15 is a flowchart illustrating an example of a setting process that the image processing apparatus performs according to the fourth embodiment.

FIG. 15 is a flowchart illustrating an example of a process performed by the image processing apparatus 1600 to prohibit the push scan setting when the encrypted communication is disabled. The description will be given below as if each process proceeds by user selection of items on the screen 1400, but there is no particular limitation to this as long as the same setting is made. The process illustrated in FIG. 15 starts from step S1501 upon acceptance of an instruction to save the scan settings such as a pressing of the "SAVE" button of the screen 1400. In step S1501, the CPU 1601 detects the pressing of the "SAVE" button by the user, and performs subsequent processing using the settings acquired and stored upon that pressing as a processing target. In step S1502, the CPU 1601 determines whether the Use Network Scan option is enabled or disabled. If the Use Network Scan option is enabled, the process proceeds to step S1503; if disabled, the process proceeds to step S1506.

In step S1503, the CPU 1601 determines whether the "Push" setting is enabled or disabled. If the "Push" setting is enabled, the process proceeds to step S1504; otherwise, the process proceeds to step S1506. In step S1504, the CPU 1601 determines whether the "Use TLS" setting is enabled or disabled. If the "Use TLS" setting is disabled, the process proceeds to step S1505; otherwise, the process proceeds to step S1506.

If the "Push" setting is enabled and "Use TLS" is enabled, the authentication information included in push scan communication is communicated in plaintext. Therefore, in step S1505, the CPU 1601 controls the system so that push scan is not performed by the scan setting acquired in step S1501. Here, a warning message indicating that the combination of this setting is impossible is displayed on the display unit, and the processing is terminated without saving the acquired setting. If the "Push" setting is enabled and the "Use TLS" setting is not enabled, the CPU 1601 stores the acquired setting as something that is not a security problem in step S1606.

In other words, although the image processing apparatus 1600 according to the present embodiment excludes performing both a push scan and plaintext communication, implementation is not limited thereto. For example, the image processing apparatus 1600 may display a warning message when the "SAVE" button is pressed as in the flowchart of FIG. 15, or may enable the setting of "Use TLS" in conjunction with the setting of "Push" being enabled. Further, the image processing apparatus 1600 may automatically disable the "Push" setting when "Use TLS" is set to disabled, and may be grayed out so as not to be selectable, for example.

According to this processing, when the push scan setting of the image processing apparatus is enabled, encrypted communication can be always performed. Therefore, when the push scan setting in the scan apparatus is enabled, linkage and prohibition setting processing are performed so that the encrypted communication setting is always enabled, such that the communication path including the authentication information is always encrypted, so that the authentication information can be prevented from being eavesdropped.

In the present embodiment, the setting as illustrated in FIG. 14 is performed in the image processing apparatus 1600. However, the setting may be input on another apparatus; for example the setting may be inputted on an external apparatus such as the processing terminal 101, and the image processing apparatus 1600 may perform the processing from step S1502 for the scan setting when the "SAVE" button is pressed.

Other Embodiments

Embodiment(s) of the present invention can also be realized by a computer of a system or apparatus that reads out and executes computer executable instructions one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-036675, filed Mar. 8, 2021, which is hereby incorporated by reference herein in its entirety.

What is claimed is:

1. An information processing apparatus which executes an application which uses a predetermined protocol that supports a scanning method for both an instruction for a pull scan and an instruction for a push scan over a network, the apparatus comprising,
    at least one memory storing instructions, and
    at least one processor executing the instructions to cause the information processing apparatus to:
        in a case where a condition related to at least any of a mode of communication with an image processing apparatus, a form of a connection with an image processing apparatus, and an authorization level of communication with an image processing apparatus is satisfied, enable an instruction for a push scan to the image processing apparatus; and
        transmit to the image processing apparatus a credential to be used in transmission processing in a push scan, wherein
        in a case where a condition related to at least any of the mode of communication, the connection form, and the authorization level is not satisfied, an instruction for a push scan to the image processing apparatus is not performed.

2. The information processing apparatus according to claim 1, wherein the condition is satisfied in a case where encrypted communication with the image processing apparatus is enabled.

3. The information processing apparatus according to claim 1, wherein the condition is satisfied in a case where the connection configuration is WiFi Direct.

4. The information processing apparatus according to claim 1, wherein the instructions further cause the image processing apparatus to acquire authorization from a user to transmit the credential, wherein
the condition is satisfied in a case where authorization from the user is acquired.

5. The information processing apparatus according to claim 1, wherein the controlling unit, in a case where the condition is not satisfied, makes a suggestion to a user to perform an instruction for a pull scan to the image processing apparatus.

6. The information processing apparatus according to claim 1, wherein the instructions further cause the image processing apparatus to determine whether or not the image processing apparatus is capable of performing a pull scan, wherein
in a case where the image processing apparatus is capable of performing a pull scan, an instruction for a pull scan to the image processing apparatus is performed.

7. An image processing apparatus which accepts an instruction from an information processing apparatus by an application which uses a predetermined protocol that supports a scanning method for both an instruction for a pull scan and an instruction for a push scan over a network, the image processing apparatus comprising,
at least one memory storing instructions, and
at least one processor executing the instructions to cause the image processing apparatus to:
determine whether or not communication with the information processing apparatus is encrypted; and
transmit, in a case where the communication is not encrypted, information indicating that a push scan is not possible to the information processing apparatus.

8. An image processing apparatus which accepts an instruction from an information processing apparatus by an application which uses a predetermined protocol that supports a scanning method for both an instruction for a pull scan and an instruction for a push scan over a network, the image processing apparatus comprising,
at least one memory storing instructions, and
at least one processor executing the instructions to cause the image processing apparatus to:
set, as a first setting, whether or not to encrypt communication with the information processing apparatus; and
set, as a second setting, whether or not to enable a push scan in accordance with the first setting.

9. The image processing apparatus according to claim 8, wherein, on the second setting, a setting to not enable a push scan in accordance with it being set that the communication is not to be encrypted is performed.

10. An information processing method performed by an information processing apparatus which executes an application which uses a predetermined protocol that supports a scanning method for both an instruction for a pull scan and an instruction for a push scan over a network, the method comprising:
enabling, in a case where a condition related to at least any of a mode of communication with an image processing apparatus, a form of a connection with an image processing apparatus, and an authorization level of communication with an image processing apparatus is satisfied, an instruction for a push scan to the image processing apparatus; and
transmitting to the image processing apparatus a credential to be used in transmission processing in a push scan, wherein
in a case where a condition related to at least any of the mode of communication, the connection form, and the authorization level is not satisfied, an instruction for a push scan to the image processing apparatus is not performed.

11. An information processing method performed by an image processing apparatus which accepts an instruction from an information processing apparatus by an application which uses a predetermined protocol that supports a scanning method for both an instruction for a pull scan and an instruction for a push scan over a network, the information processing method comprising:
determining whether or not communication with the information processing apparatus is encrypted; and
transmitting, in a case where the communication is not encrypted, information indicating that a push scan is not possible to the information processing apparatus.

12. An information processing method performed by an image processing apparatus which accepts an instruction from an information processing apparatus by an application which uses a predetermined protocol that supports a scanning method for both an instruction for a pull scan and an instruction for a push scan over a network, the information processing method comprising:
setting whether or not to encrypt communication with the information processing apparatus; and
setting whether or not to enable a push scan in accordance with the setting as to whether or not to encrypt the communication.

13. A non-transitory computer-readable storage medium storing a program which, when executed by a computer comprising a processor and a memory, executes an application which uses a predetermined protocol that supports a scanning method for both an instruction for a pull scan and an instruction for a push scan over a network, and causes the computer to:
enable, in a case where a condition related to at least any of a mode of communication with an image processing apparatus, a form of a connection with an image processing apparatus, and an authorization level of communication with an image processing apparatus is satisfied, an instruction for a push scan to the image processing apparatus; and
transmit to the image processing apparatus a credential to be used in transmission processing in a push scan, wherein
in a case where a condition related to at least any of the mode of communication, the connection form, and the authorization level is not satisfied, an instruction for a push scan to the image processing apparatus is not performed.

* * * * *